Sept. 15, 1931.  S. E. LESHER  1,823,834

SHOCK ABSORBER

Filed Oct. 22, 1929  2 Sheets-Sheet 1

INVENTOR.
Samuel E. Lesher,
BY
Geo. L. Kimmel
ATTORNEY.

Sept. 15, 1931.   S. E. LESHER   1,823,834
SHOCK ABSORBER
Filed Oct. 22, 1929   2 Sheets-Sheet 2
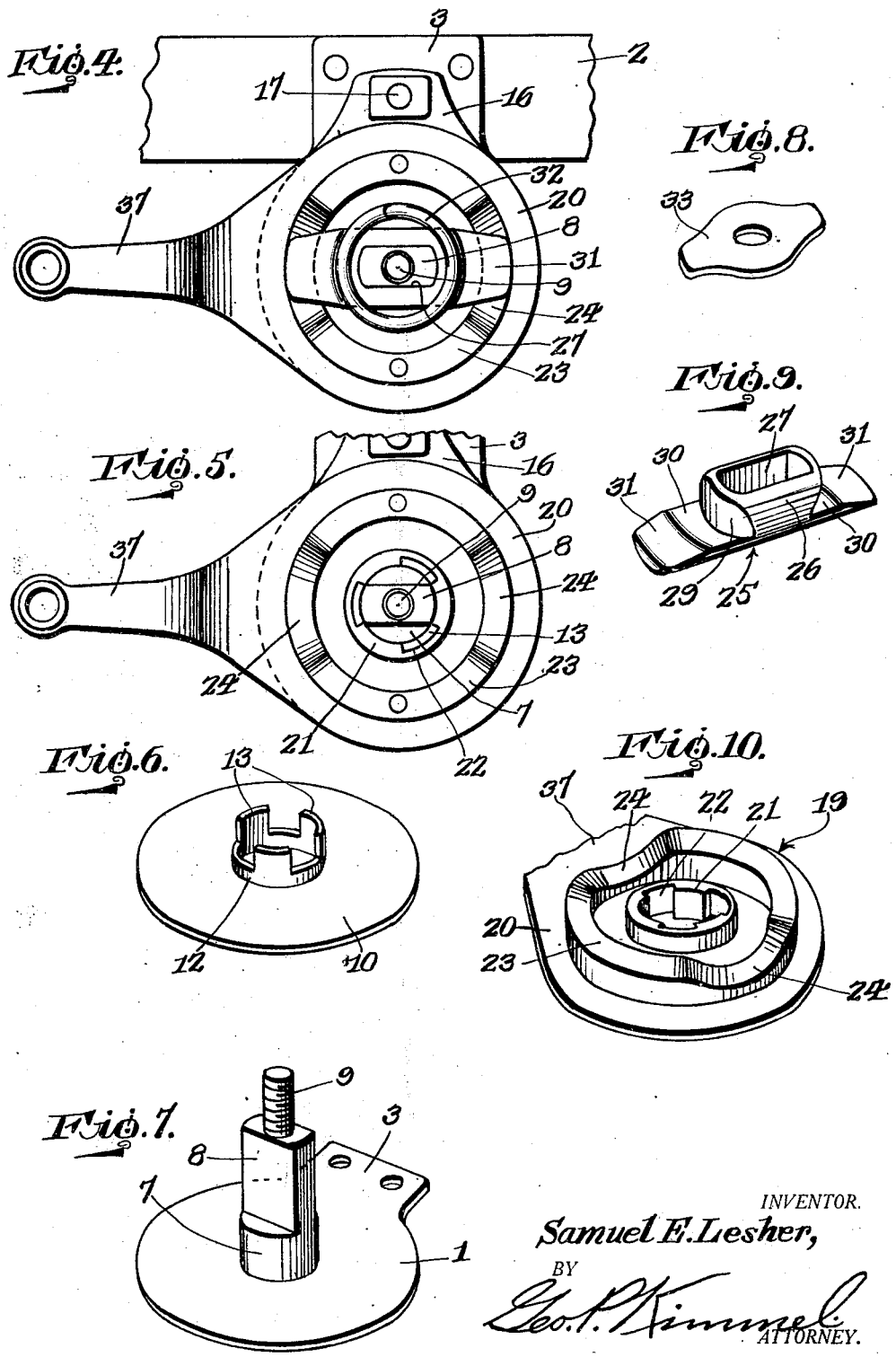
INVENTOR.
Samuel E. Lesher,
BY
Geo. P. Kimmel
ATTORNEY.

Patented Sept. 15, 1931

1,823,834

UNITED STATES PATENT OFFICE

SAMUEL E. LESHER, OF MARION, OHIO

SHOCK ABSORBER

Application filed October 22, 1929. Serial No. 401,547.

This invention relates to a shock absorber for spring supported vehicle bodies and has for its primary object to provide, in a manner as hereinafter set forth, a device of such character by means of which the movement of the vehicle body relative to the axle is frictionally resisted and wherein such frictional resistance is increased during the movement of the body both toward and from the axle.

A further object of the invention is to provide a device of the character aforesaid, which is adapted for connection between a vehicle body and axle at either side of the body or at either end thereof, thereby eliminating the necessity of producing the snubber in right and left or front and rear pairs, consequently minimizing the expense of manufacturing the shock absorber.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative rather than limitative, and that the invention is intended to be limited only by the scope of the claims hereunto appended.

In the accompanying drawings in which like numerals are employed to designate like parts throughout the same:

Figure 1 is a sectional elevation of a shock absorber in accordance with this invention showing the manner of attaching the same to a vehicle frame.

Figure 2 is a section taken on line 2—2 of Figure 1.

Figure 3 is a section taken on line 3—3 of Figure 1.

Figure 4 is a view similar to Figure 1 with the casing, tension adjusting nut, and spring retaining washer removed.

Figure 5 is a view similar to Figure 4 with the spring and stationary cam removed.

Figure 6 is a detailed perspective view of the rotatable plate.

Figure 7 is a detailed perspective view of the rear face plate and spindle carried thereby.

Figure 8 is a detailed perspective view of the spring retaining washer.

Figure 9 is a detailed perspective view of the stationary cam.

Figure 10 is a detailed perspective view of the rotatable cam.

Referring to the drawings in detail, the numeral 1 designates the rear face plate of the shock absorber which is adapted to be rigidly secured to a vehicle frame 2, by means of a lug 3 formed on the plate 1. Extending through a centrally disposed aperture in the plate 1 is a spindle indicated generally by the numeral 4, the rearward end of which is upset as indicated at 5 to bear against the rear face of the plate 1. Spaced from the upset end 5 is an external shoulder 6 on the spindle 4 which opposes the forward face of the plate 1 by means of which the plate and spindle are secured together. The spindle 4 includes a cylindrical portion 7 extending from the forward face of the plate 1 which merges in a central portion 8 quadrangular in cross section, and terminates at its forward end in an externally threaded, reduced cylindrical portion 9.

Rotatably mounted on the cylindrical portion 7 is a rotatable plate 10 and interposed between the plates 10 and 1 is a friction disc 11. The plate 10 is formed with an annular flange 12 which encircles the portion 7 and the free edge of which is notched to provide a plurality of spaced legs 13. Seating against the forward face of the plate 10 is a friction disc 14 and seated against the forward face of the disc 14 is a stationary metal plate 15 which is formed with an ear 16 secured to the lug 3 by means of a suitable holdfast device 17. The disc 14 and plate 15 encircle the flange 12. Seated against the outer face of the plate 15 is a friction disc 18 which encircles the spaced legs 13.

Rotatably mounted on the portion 7 of the spindle is a rotatable cam element indicated generally at 19 and including a plate-like member 20 formed with a centrally disposed, apertured boss 21 through which the portion 7 extends. The inner periphery of the boss 21 is provided with a plurality of spaced recesses 22 through which the legs 13 slidably extend and by means of which the plate 10 and cam element 19 are locked together for unitary movement about the cylindrical portion 7 of the spindle. Extending from the forward face of the member 20 is an axially disposed flange 23 which is formed at diametrically opposite points with depressions 24. The flange 23 is arranged substantially midway between the boss 21 and the outer peripheral face of the member 20.

Slidably mounted on the quadrangular portion 8 of the spindle is an elongated, stationary cam element 25, the central portion of which is cylindrical in cross section as indicated at 26 and is formed with an opening 27 extending transversely therethrough. The opening 27 conforms in contour with the portion 8 and the latter extends therethrough. The rear face of the cam element 25 is arcuate in contour and normally seats within the depressions 24 of the rotatable cam element 19.

A central portion of the rear face of the cam element 25 is notched as indicated at 28 to provide a clearance for the boss 21. On opposite sides of the central portion 26, the cam element 25 is provided in its forward face with notches, the side walls 29 of which are arcuate and the rear walls 30 of which extend from the side walls at substantially right angles, then incline outwardly and rearwardly as indicated at 31. Seated on the rear walls 30 of the notches in the cam element 25 and encircling the side walls 29 of the notches is a relatively heavy coiled spring 32 which is retained in position by means of an elongated washer 33 which is provided with a centrally disposed aperture through which the threaded portion 9 of the spindle extends. The tension of the spring 32 may be adjusted by means of a nut 34 which is threaded on the portion 9 and bears against the forward face of the washer 33.

Seated on the member 20 of the rotatable cam element 19 is a casing 35, which is secured to the member 20 by means of suitable holdfast devices passing through apertured ears 36 formed on the casing. The casing 35 is adapted to contain a lubricant for reducing the friction between the stationary cam element 25 and the rotatable cam element 19. Formed integrally with the member 20 of the rotatable cam element 19 is an actuating arm 37 which is adapted to be connected with an axle of the vehicle.

In operation the end portions of the stationary cam 25 is normally seated within the depressions 24 of the rotatable cam element 19, in which position there is comparatively little friction between the friction disc and metal plate of the shock absorber. Upon the actuation of the arm 37 in either direction, the cam element 19 is rotated and the inclined surfaces of the depressions 24 ride under the end portions of the stationary cam element 25 whereby the friction between the friction discs and metal plates is increased by the action of the spring 32.

So long as the arm 37 continues to move the friction between the discs and plates will be increased. Upon the return movement of the arm 37, the rotatable cam element 19 will be rotated in the opposite direction and the friction between the discs and plates will be gradually decreased. Owing to the locking arrangement of the legs 13 carried by the plate 10 with the walls of the notches 22 in the boss 21 of the rotatable cam element 19, the plate 10 will be rotated coincidentally with the rotation of the cam element 19.

Assuming that in the embodiment illustrated in Figure 1, the shock absorber is secured to the left side of a vehicle frame with the actuating arm 27 extending rearwardly and that it is desired to secure the shock absorber to the right side of the vehicle frame with the actuating arm 37 extending rearwardly, this may be accomplished simply by rotating the actuating arm 37 through an arc of 180°. Thus it will be seen that the shock absorber may be attached to either side of a frame and with the actuating arm extending either forwardly or rearwardly as desired.

It is thought that the many advantages of a shock absorber in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. In a shock absorber, a spindle, a plate rotatably mounted thereon and having an annular flange encircling the spindle, said flange being notched in its free edge to provide a plurality of spaced legs, a plate-like member having an aperture through which the spindle extends, the wall of said aperture being recessed for the reception therein of said legs, an annular flange formed on said member and having a plurality of depressions having inclined surfaces, a cam element non-rotatably mounted on the spindle and having projecting portions normally seated in said depressions, resilient means pressing the cam element against said inclined surfaces, a stationary plate mounted on the spindle between said rotatable plate and plate-like member, friction discs interposed between the stationary plate, rotatable plate and plate-like member, and means for rotating said plate-like member.

2. In a shock absorber, a spindle, a plate rotatably mounted thereon and having an annular flange encircling the spindle, said flange being notched in its free edge to provide a plurality of spaced legs, a plate-like member having an aperture through which the spindle extends, the wall of said aperture being recessed for the reception therein of said legs, an annular flange formed on said member and having a pair of oppositely disposed depressions having inclined surfaces, an elongated cam element non-rotatably mounted on the spindle and having its end portions normally seated in said depressions, a coiled spring encircling said spindle and seating on said cam element, an elongated retaining washer for said spring, a nut threaded on the spindle for adjusting the tension of the spring, a stationary plate mounted on the spindle between said rotatable plate and plate-like member, friction discs interposed between the stationary plate, rotatable plate and plate-like member, and means for rotating said plate-like member.

3. In a shock absorber, a spindle having a cylindrical portion, a quadrangular portion, and an externally threaded portion, a plate rotatably mounted on the cylindrical portion and having an annular flange encircling the same, said flange being notched in its free edge to provide a plurality of spaced legs, a plate-like member having an aperture through which the cylindrical portion extends, the wall of said aperture being recessed for the reception therein of said legs, an annular flange formed on said member and having a pair of oppositely disposed depressions having inclined surfaces, an elongated cam element slidably and non-rotatably mounted on said quadrangular portion and having its end portions normally seated in said depressions, resilient means pressing the cam element against said inclined surfaces, a stationary plate interposed between said rotatable plate and plate-like member, friction discs interposed between the stationary plate, rotatable plate and plate-like member, and means for rotating said plate-like member.

4. In a shock absorber, a spindle having a cylindrical portion, a quadrangular portion, and an externally threaded portion, a plate rotatably mounted on the cylindrical portion and having an annular flange encircling the same, said flange being notched in its free edge to provide a plurality of spaced legs, a plate-like member having an aperture through which the cylindrical portion extends, the wall of said aperture being recessed for the reception therein of said legs, an annular flange formed on said member and having a pair of oppositely disposed depressions having inclined surfaces, an elongated cam element slidably and non-rotatably mounted on said quadrangular portion and having its end portions normally seated in said depressions, a coiled spring concentrically disposed with respect to said spindle and seating on said cam element, an elongated retaining washer for said spring, a nut threaded on the externally threaded portion of said spindle for adjusting the tension of the spring, a stationary plate interposed between the rotatable plate and plate-like member, friction discs interposed between the stationary plate, rotatable plate and plate-like member, and means for rotating said plate-like member.

5. In a shock absorber, a stationary plate, a spindle carried thereby, a rotatable plate mounted on the spindle and having an annular flange encircling the same, a stationary plate encircling said flange and secured to the stationary plate carrying the spindle, a rotatable cam element slidably and non-rotatably connected with said flange, friction discs interposed between said stationary plate, rotatable plate and rotatable cam element, a cam element slidably and non-rotatably mounted on the spindle, resilient means pressing said cam elements into engagement, and means for rotating said rotatable cam element.

6. In a shock absorber, a stationary plate, a spindle carried thereby, a rotatable plate mounted on the spindle and having an annular flange encircling the same, a stationary plate encircling said flange and secured to the stationary plate carrying the spindle, a rotatable cam element slidably and non-rotatably connected with said flange, friction discs interposed between said stationary plate, rotatable plate and rotatable cam element, a cam element slidably and non-rotatably mounted on the spindle, resilient means pressing said cam elements into engagement, and means for rotating said rotatable cam element, said resilient means including a coiled spring encircling said spindle and seating against the non-rotatable cam element, an elongated retaining washer for the spring, and a nut threaded on the spindle and engaging the outer face of said washer.

In testimony whereof, I affix my signature hereto.

SAMUEL E. LESHER.